United States Patent
Kalar et al.

(10) Patent No.: US 7,526,397 B2
(45) Date of Patent: Apr. 28, 2009

(54) METHODS AND APPARATUS FOR CALIBRATING DISTRIBUTED FIBER TEMPERATURE SENSING SYSTEM

(75) Inventors: Kent Kalar, Austin, TX (US); Michael E. Sanders, Austin, TX (US); Chung Lee, College Station, TX (US); Brian Park, Austin, TX (US); Mohammed Fassih-Nia, Austin, TX (US)

(73) Assignee: SensorTran, Inc., Austin, TX (US)

( * ) Notice: Subject to any disclaimer, the term of this patent is extended or adjusted under 35 U.S.C. 154(b) by 0 days.

(21) Appl. No.: 11/685,628

(22) Filed: Mar. 13, 2007

(65) Prior Publication Data
US 2008/0040062 A1  Feb. 14, 2008

Related U.S. Application Data

(60) Provisional application No. 60/791,158, filed on Apr. 11, 2006, provisional application No. 60/888,444, filed on Feb. 6, 2007.

(51) Int. Cl.
*G01K 15/00* (2006.01)

(52) U.S. Cl. ........................................ 702/99

(58) Field of Classification Search .................. 702/85, 702/99, 130; 73/25–27
See application file for complete search history.

(56) References Cited

U.S. PATENT DOCUMENTS 4,891,629 A * 1/1990 Gajjar et al. ................ 340/632
4,932,243 A * 6/1990 Suh et al. ...................... 73/73

FOREIGN PATENT DOCUMENTS

GB  2210451 A * 6/1989

OTHER PUBLICATIONS

"Spinoff 2006: Innovative Partnerships Program" by the National Aeronautics and Space Administration Center for AeroSpace Information (CASI) pp. 94-97.

* cited by examiner

*Primary Examiner*—Bryan Bui
(74) *Attorney, Agent, or Firm*—M. A. Ervin & Associates; Michael A. Ervin

(57) ABSTRACT

Systems and methods for calibrating a temperature sensing system are disclosed. In one respect, a line may be placed in operative relation with a first reference cell and a second reference cell. The temperatures of the first and second reference cells may be adjusted. In one non-limiting example, the temperature of the first reference cell may be adjusted to a temperature above an ambient temperature and the temperature of the second reference cell may be adjusted to a temperature below an ambient temperature. The temperature sensing system may be calibrated based on the temperature data of the first and second reference cells.

10 Claims, 10 Drawing Sheets

FOR RECEIVING PUCK RETAINING SCREW 6

METHODS AND APPARATUS FOR CALIBRATING DISTRIBUTED FIBER TEMPERATURE SENSING SYSTEM

This application claims priority to provisional patent applications Ser. No. 60/791,158 filed Apr. 11, 2006 and Ser. No. 60/888,444 filed on Feb. 6, 2007. The entire text of each of the above-referenced disclosures, including figures, is specifically incorporated by reference herein without disclaimer.

BACKGROUND OF THE INVENTION

1. Field of the Invention

The present invention relates generally to temperature sensing. More particularly, the present disclosure relates to systems for calibrating temperature profiles in for example, a distributed line system.

2. Description of Related Art

Temperature ranges in lines such as cable lines, pipelines, and the like may determine many factors including loading. Although the thermal performance of cable insulation can be reliably modeled using current techniques in the art, thermal parameters of the environments in which the lines operate may vary and thus, may be unpredictable. For example, heat sources located near the lines may affect the temperature. Another example includes the effects of ambient environment temperature external to the lines, which may contribute to the thermal parameters.

Current techniques seek to determine areas such as hot spots in the lines to determine defective components, degradation of insulation, or even possible failure (e.g., short circuit). However, gathering the data may sometimes be difficult as some lines are buried underground and may operate at very high potentials relative to ground.

One example of current temperature sensing techniques uses a pulse of laser light through the line and then relies on certain light scattering phenomenon that varies with temperature in order to indicate within a few degrees what the temperature is along a specific distribution route. While the current techniques and systems have provided some advantages, they fail to provide, among other things, accurate temperature profiling of a line.

The referenced shortcomings are not intended to be exhaustive, but rather are among many that tend to impair the effectiveness of previously known techniques for temperature profiling; however, those mentioned here are sufficient to demonstrate that the methodologies appearing in the art have not been altogether satisfactory and that a significant need exists for the techniques described and claimed in this disclosure.

SUMMARY OF THE INVENTION

The present disclosure provides systems and techniques for temperature sensing in a distributed line system, such as a fiber optic line. The temperature sensing system may provide temperature stability to a reference coil or cell, where the reference cell may be surrounded with an insulating layer. A control element, coupled to the reference cell, may have a local power supply and data access port which may operate independently or in connection with a distribution temperature system (DTS). Autonomous circuit controls (e.g., TE controllers and/or TE modules) may determine the inner temperature with a feedback loop to maintain or adjust temperatures with preset time spans which may be monitored by thermocouples, resistive temperature detectors (RTD), or other temperature sensing devices.

The reference coil or cell may include a mandrel for inserting or removing a line (e.g., fiber optic cable). Alternatively, line may be wrapped around the reference coil. In each of these configurations, the reference coil may be removed from the temperature sensing system and reinserted after the fiber is wrapped.

The autonomous circuit controls may vary the temperature of the reference coils by providing different temperatures. A DTS, coupled to the temperature sensing system may empirically derive when the reference coils have reached a stable temperature value, and thus, the DTS may be calibrated to absolute temperatures.

In one respect, a system for calibrating a fiber temperature sensing system is provided. The system may include a first reference cell for attaining a first temperature and a second cell for attaining a second temperature. A first control system may be coupled to the first reference cell and may be used to control the temperature of the first reference cell. Similarly, a second control system, coupled to the second reference cell, may be used to control the temperature of the second reference cell. The first and second reference cells may be configured to allow a fiber optic cable to be wrapped around the first and second reference cells. The system may calibrate the fiber temperature sensing system using the temperature data from the first and second reference cells.

In other respects, a method is provided. The method may include placing a line, such as a fiber optical cable, in operative relation with a first reference cell and a second reference cell. The temperature of the first and second reference cells may be adjusted. For example, the first reference cell may be adjusted to a temperature above an ambient temperature and the second reference cell may be adjusted to a temperature below an ambient temperature. A distributed temperature sensing system may be calibrated based on the temperatures of the first and/or second reference cells.

The terms "a" and "an" are defined as one or more unless this disclosure explicitly requires otherwise.

The term "substantially," "about," and its variations are defined as being largely but not necessarily wholly what is specified as understood by one of ordinary skill in the art, and in one-non-limiting embodiment substantially refers to ranges within 10%, preferably within 5%, more preferably within 1%, and most preferably within 0.5% of what is specified.

The term "coupled" is defined as connected, although not necessarily directly, and not necessarily mechanically.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF THE ILLUSTRATIVE EMBODIMENTS

Figure 1:
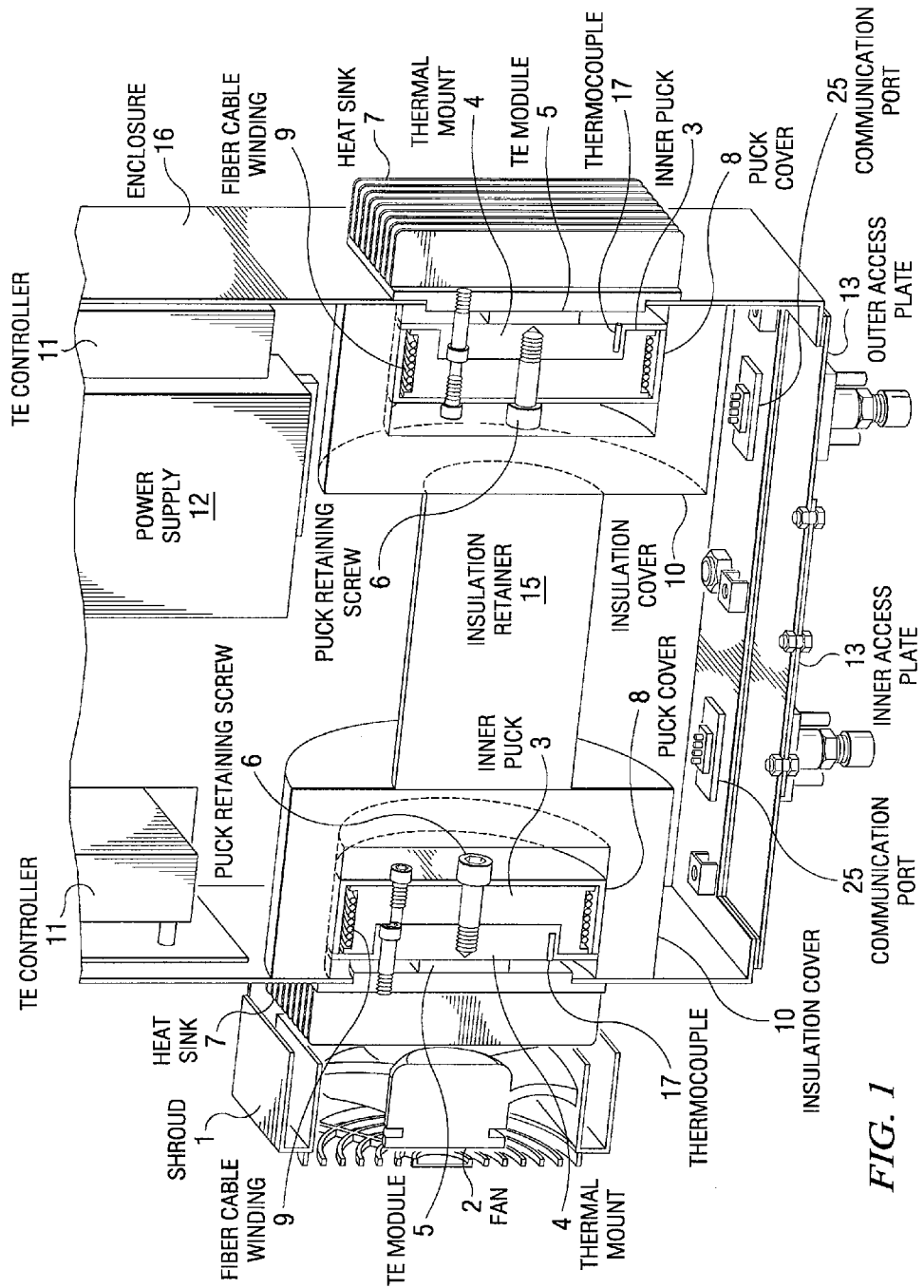
FIG. 1 shows a cross-sectional view of a temperature sensing system, in accordance with embodiments of the disclosure.

The disclosure and the various features and advantageous details are explained more fully with reference to the non-limiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

DTS temperature sensors are useful instruments for applications in areas that include, without limitation, industrial process, utility monitoring, and oil and gas production. Optical fiber is immune to electromagnetic interference (EMI) and does not radiate EMI, making it useful in many of these applications. Many temperature data points may be processed along a considerable length, e.g., 10 kilometers or more, of fiber. The resultant distributed measurements may be equivalent to numerous conventional point temperature sensors which, as deployed, would have comparatively higher installation and operating costs.

Fiber optic temperature measurement systems may require a remote calibration system so that measurements by, for example, temperature sensors, can be accurate. A device of the present disclosure provides, among other advantages, two reference points. The reference point may be above ambient temperature and may be below ambient temperature, from which accurate temperatures may be automatically derived. The system may use the actual fiber used in the field so that any signal effects due to a different fiber type are reduced or substantially eliminated.

An system, such as a DTS instrument, may introduce laser energy into a sensing fiber probe. The temperature along the probe may be calculated from a ratio of the Raman backscattered intensities. Temperature indifferent Raman Stokes backscattering may be return and may be compared to the temperature sensitive Anti-Stokes intensity. Typically a DTS includes a length of fiber wound into a reference coil or cell that may be used to measure to a known temperature. This reference coil or cell, which may be located in the DTS instrument or as a standalone unit, may be utilized to calibrate the temperature profile measurement to an absolute temperature. For some deployed fiber probe scenarios, accuracy may be enhanced with the aid of additional reference coil(s) residing, for example, somewhere integral to the probe path.

The present disclosure provides one or more reference temperature locations along a line and may not require a line or communication to a DTS instrument. The system may include an independent power source, such as a DC power source, an AC power source, a solar collector, or the like. The system may change its internal fiber coil temperatures providing different values for the DTS to determine an absolute temperature. The DTS may subsequently be programmed with the absolute temperature, and may empirically derive when the reference coils or cells of the system has reached the stable temperature values through an integral fiber probe coupled to the reference coils and may perform a calibration.

In one respect, a system comprising two reference cells, which can be heated or cooled to specific temperatures, may be used. The reference cells may use a standard resistance heater for heating to a specified temperature. Alternatively, the reference cells may use a heating and cooling source such as a thermo electric (TE) module. The TE modules may each have their own controller ("TE controllers") and power supply, and may be powered by a voltage source such as a 110 voltage source or a 220 voltage source. Alternatively, one controller may be used to control the TE modules. In certain embodiments, the controllers may be set up by communication to the controllers via communication ports 25, on the bottom of the enclosure, by connecting a laptop, computer, processor, personal digital assistant (PDA), wired or wireless telephone, or other handheld communication or computing device (collectively "processing device"). Using software instructions executed by the processing device, or alternatively, hardware components that are operably configured (either by software instructions, mechanical means, or human control), the TE controllers may be set up. In particular, each of the TE controllers may receive instructions to change the temperature of the corresponding reference cell to a pre-determined temperature. The pre-determined temperature may be above the ambient temperature. In addition to or alternatively, the pre-determined temperature may be below the ambient temperature.

Alternatively, in some embodiments, the reference cells may be set to about ambient temperature, for variable temperature design. The controllers for each of the reference cell (or puck) may provide a floating temperature setting and may work with the heating and/or cooling elements to provide the needed temperature settings. The output of the temperature setting, e.g., similar to the graph shown in FIG. 7, may show a spike that would represent an ambient temperature.

In some respects, a communication port (e.g., RS232 port, USB port, etc.) for each reference cell may be provided. Once the system is set (i.e., does not require additional programming), the system may be coupled to any portion of a line which may have a length of 15 km or greater. Alternatively, the distribution line system may have a length of less than 15 km.

Figure 3:
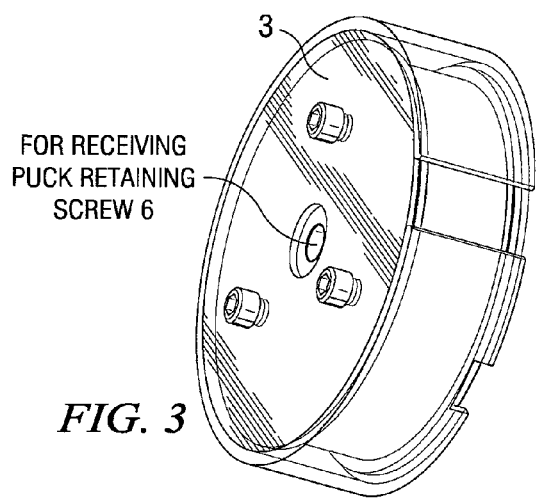
FIG. 3 shows a puck, in accordance with embodiments of the disclosure.

Referring to FIG. 1, a cross-sectional view of the reference cells in an enclosure is shown. Each of the reference cells, separated by an insulation retainer 15, may include a puck 3 where line 9 (such as a fiber optic cable) may be wound, and a puck cover 8 which retains line 9 on inner puck 3. In some embodiments, puck 3 may be or include aluminum. Alternatively or in addition to, puck 3 may utilize copper or other materials that exhibit good heat retention properties. Puck 3 is shown in more detail in FIG. 3.

Puck 3 may be mounted on a thermal mount plate 4 and may be retained by puck retaining screw 6. Thermal mount plate 4 may be coupled to a thermo electric (TE) module 5 which may provide heating and/or cooling to puck 3 depending on the polarity of an applied current.

Any excess heat from TE module 5 may be transferred outside of enclosure 16 to the atmosphere by heat sink 7. In some embodiments, a fan 2 and/or shroud 1 may be used to improve heat transfer to the atmosphere. The temperature may be measured by thermocouple 17 which may provide a signal to the TE controller 11. The TE controller may in turn control the TE module 5 and thus the temperature of the puck 3.

In some embodiments, each reference cell may be enclosed by an insulation cover 10, which is held in place by insulation retainer 15. Insulation retainer 15 may be made from a foam plastic. Instead of or an addition to insulation retainer 15, the reference cells may be held in place by tape, metal or plastic straps attached to the main housing, or elastic or rubber bands attached to the main housing.

Figure 2A:
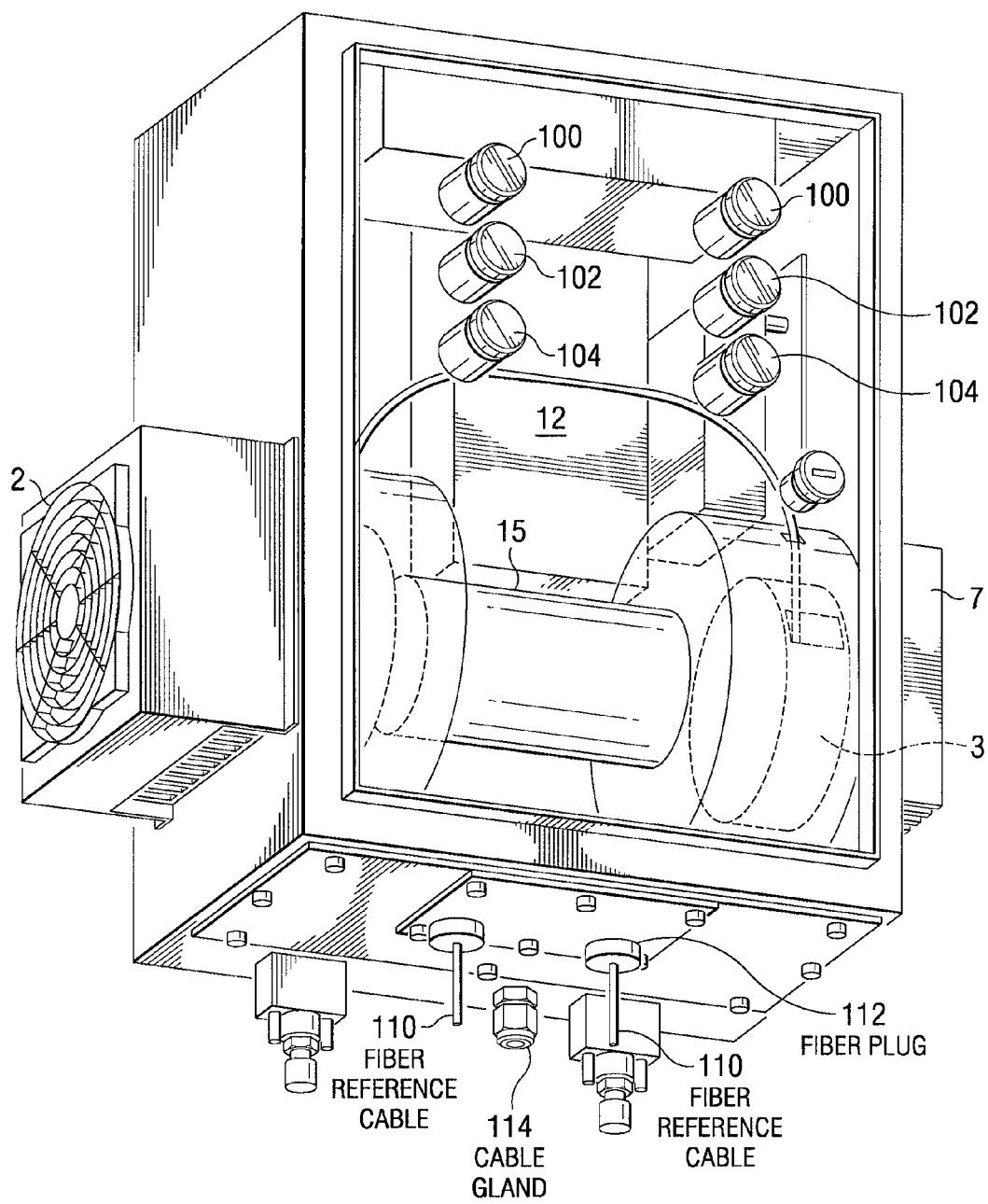
FIGS. 2A and 2B show a side view of a temperature sensing system, in accordance with embodiments of the disclosure.
Figure 2B:
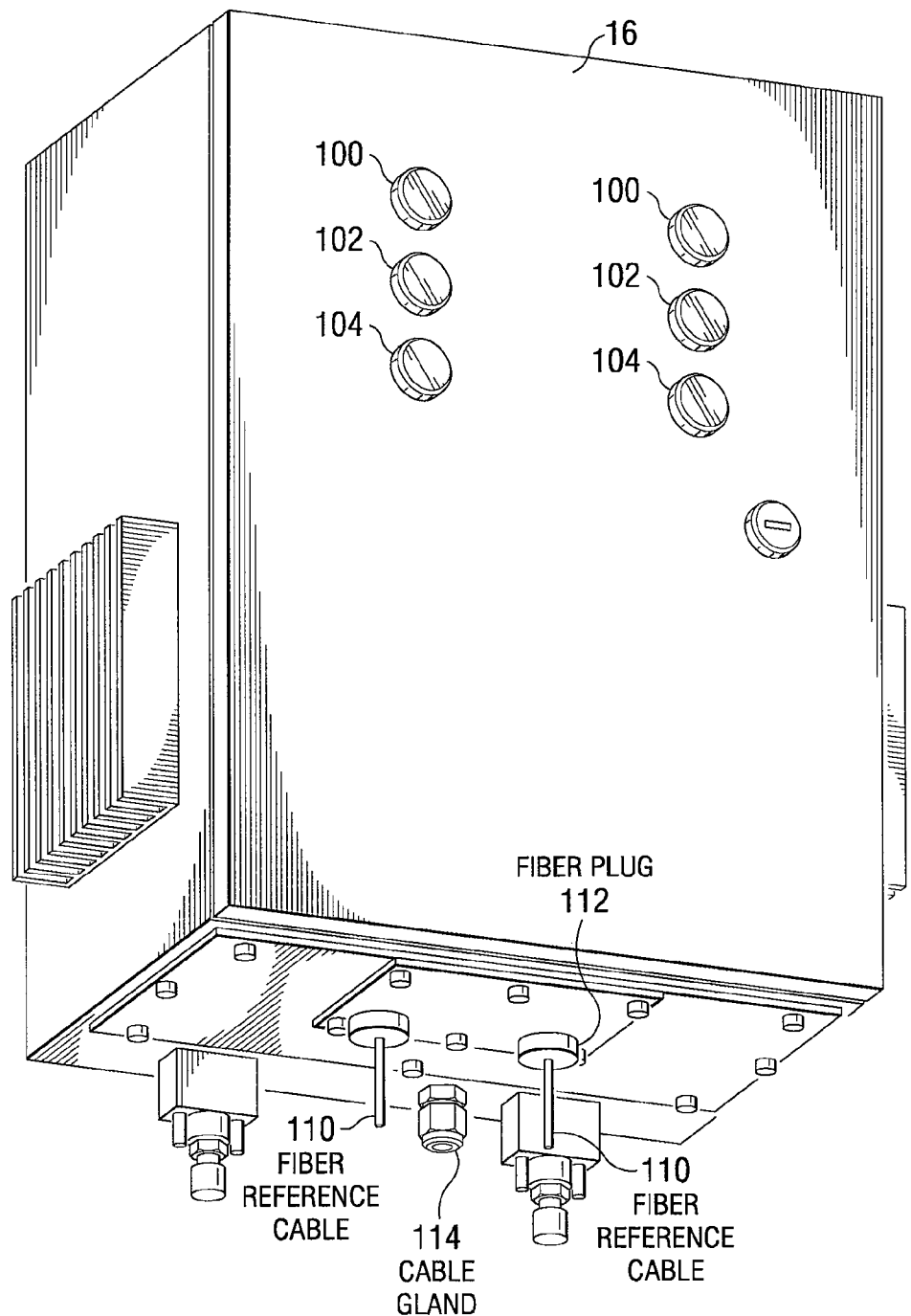

Referring to FIGS. 2A and 2B, a side profile view of the system is shown. In some embodiments, the system may include 6 indicator lights, 3 for each reference cell (i.e., a red light 100, a green light 102, and a blue light 104). Each of the indicator lights may indicate the status of the temperature adjustment of the reference cell. For example, the red light may indicate adjusting of a temperature to above a set temperature while a blue light may indicate adjusting of a temperature to below a set temperature. The green light may indicate that the desired temperature has been reached.

The system may also include fiber optic reference coil 110 which is a fiber optic cable that may be wrapped around the puck/reference cell. When the puck is heated or cool, the fiber's temperature may be substantially similar to the puck's temperature and may be detected by, for example, a DTS system. Coupled to fiber optic reference coil 110 may be fiber plug 112 which may hold reference coil 110 in place and may provide a waterproof exit to the enclosure, via for example, cable gland 114. For example, cable gland 114 may provide an area where a power cable from power source 12 may be traversed through.

In some respects, pucks 3 may be removable so that line 9, such as but not limited a fiber optic cable from a site, may be wound on the pucks 3 externally. After the winding process, both pucks may be inserted into the enclosure 16 from the bottom by removing, for example, the inner access plate 13 and outer access plate 14.

Figure 4:
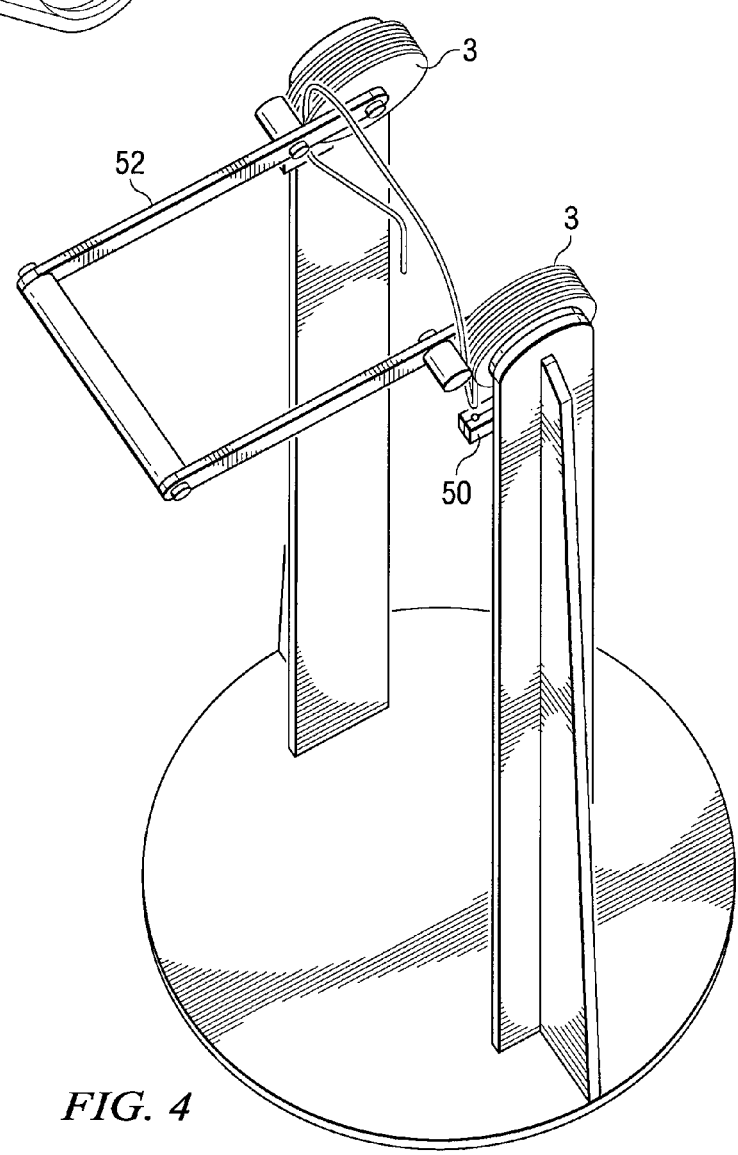
FIG. 4 shows a puck winding assembly, in accordance with embodiments of the disclosure.

In some embodiments, a loop of a line may be wound on both pucks simultaneously using, for example, a winding assembly such as the one shown in FIG. 4. For example, a 5 meter long line may be wound onto both pucks simultaneously for about 8 turns on each. One of ordinary skill in the art would recognize that the number of turns may depend on the length of the line as well as the diameter of the pucks.

The winding assembly shown in FIG. 4 may be operably configured to wind a line around the pucks. For example, a line may be formed into a loop approximately 2 m to 3 m high, although the dimensions may vary based on the winding assembly and/or puck's dimensions. Each end of the loop may be fixed to grip 50. Pucks 3 may be fixed to the tool, and a winding mandrel 52 may hold the pucks in place with, for example, retaining screws. In one respect, the pucks may be spaced apart at a similar or substantially the same distance as they are within enclosure 16. Winding may begin on the outside of the pucks, nearest the arm supports, and winds into the center. Both pucks may be wound at the same time to eliminate twisting of the cable.

In one respect, the line may be wound around the pucks rather than rotating the pucks and pulling the line in. The mandrel may be rotated by hand or a motorized version may be used. Once the pucks are fully wound, the mandrel may be removed and the pucks are transferred to the enclosure 16 with the cable in place. In one respect, the puck with the line may be inserted into the enclosure from below, where pucks may be bolted in place. Next the outer covers of the puck and enclosure are set in place and cable plugs are provided to secure the line.

Figure 5A:
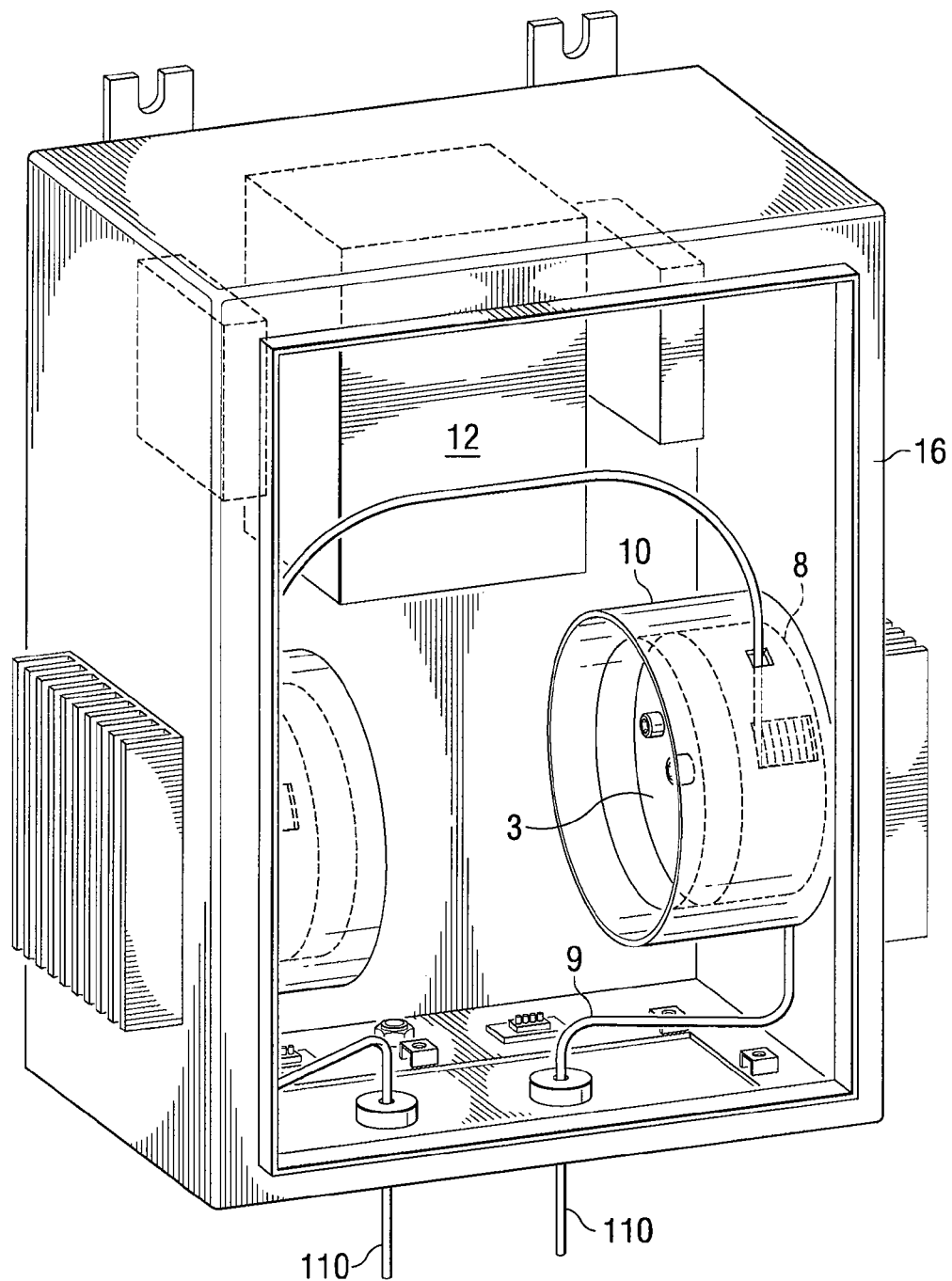
FIGS. 5A and 5B show a side view of a temperature sensing system, in accordance with embodiments of the disclosure.
Figure 5B:
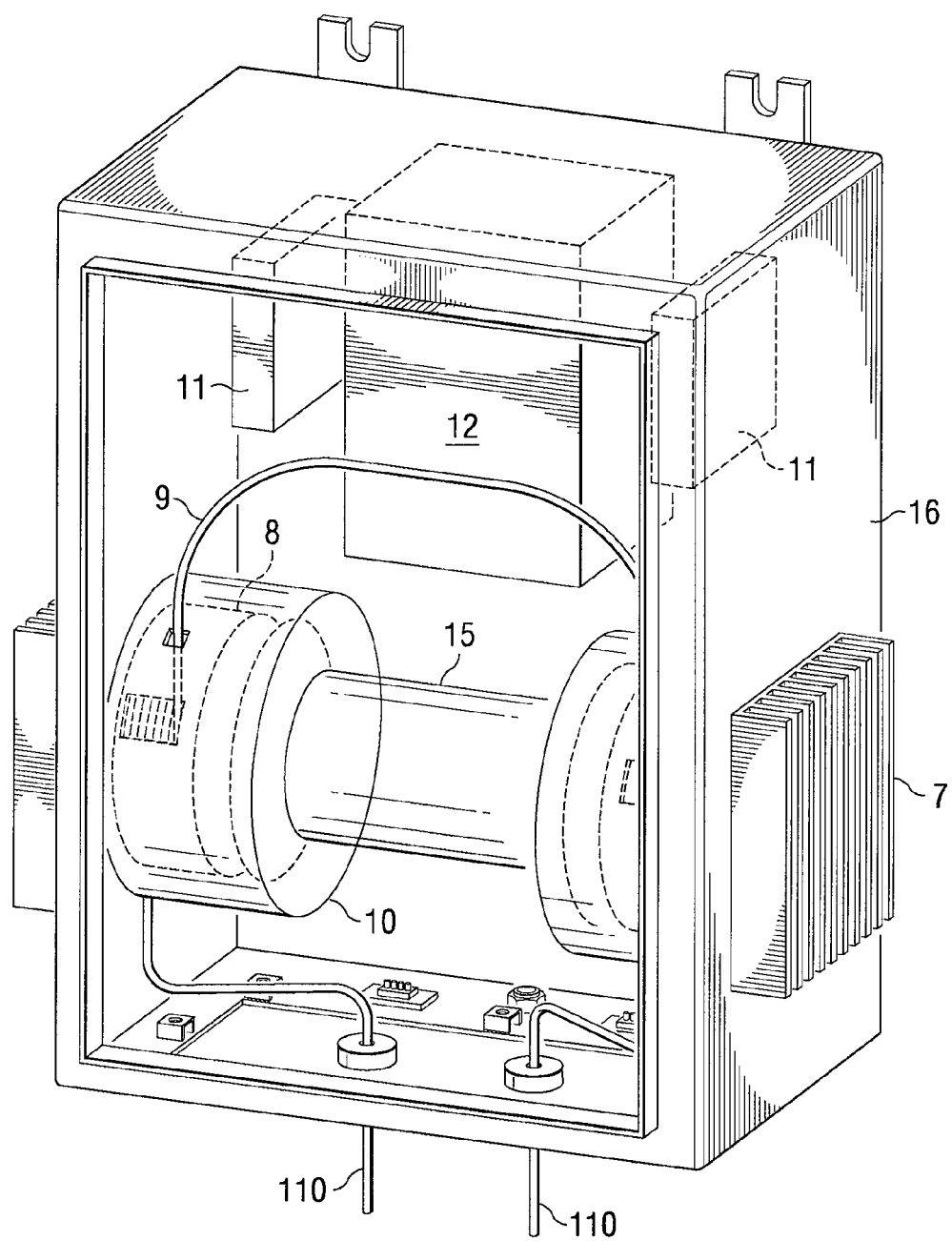

In some embodiments, line 9 may be a fiber optic cable which may have a plastic shroud. The fiber optic cable 9 may be wound onto the pucks by hand or by a winding assembly. Alternatively, the fiber optic cable may have a metal shroud which may be beneficial to wrap around a puck with a tool, such as, for example the assembly shown in FIG. 2. In some respects, the winding assembly may wind the fiber on both pucks simultaneously. The fiber optic cable may not be cut to for the winding, and in certain embodiments, the two pucks may be wound together to reduce the likelihood that the line would become twisted. After the fiber optic cable is in place in both pucks, the pucks may be inserted into enclosure 9, as shown in FIGS. 5A and 5B.

Figure 6A:
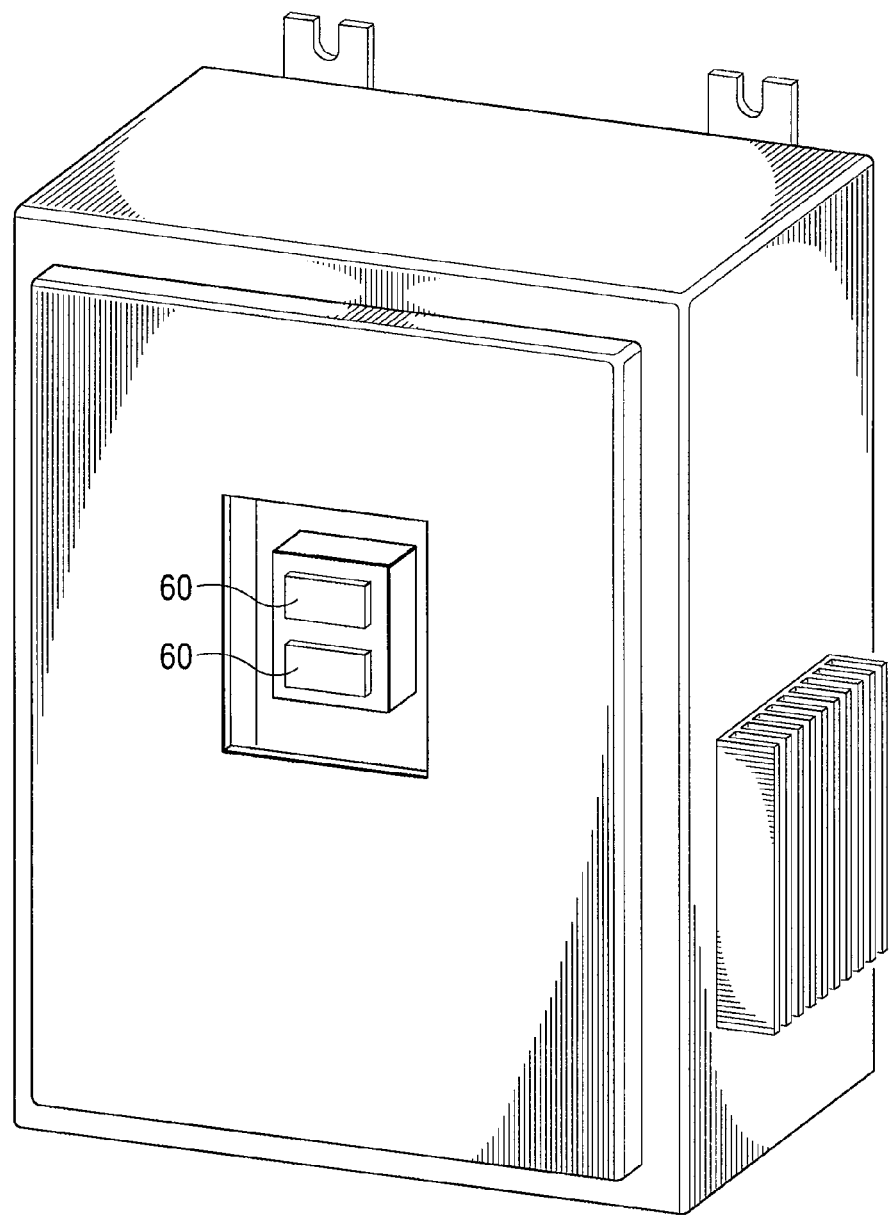
FIGS. 6A and 6B show various views of a temperature sensing system, in accordance with embodiments of the disclosure.

In other respect, enclosure 16 may include two internal displays visible through a window, as shown in FIG. 6A. Displays 60 may be used during setup to set the temperature and may also be used to monitor the temperature.

Figure 6B:
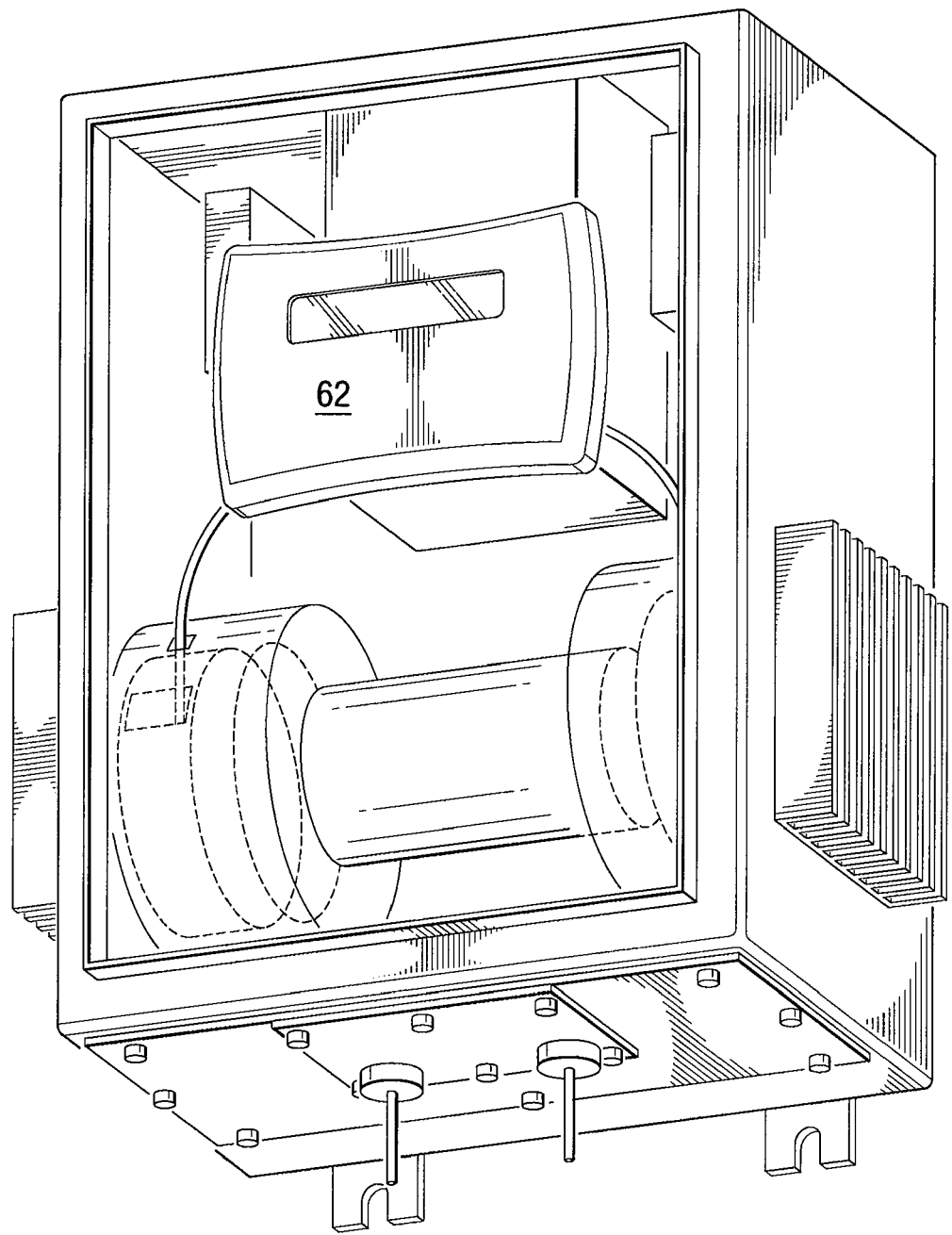

Alternatively, in FIG. 6B, a self-contained controller may be used such that external communication may not be needed during set up (i.e., selecting reference point temperatures for each puck). The self-contained controller may show temperatures on a display, such as an alphanumeric display.

Figure 8:
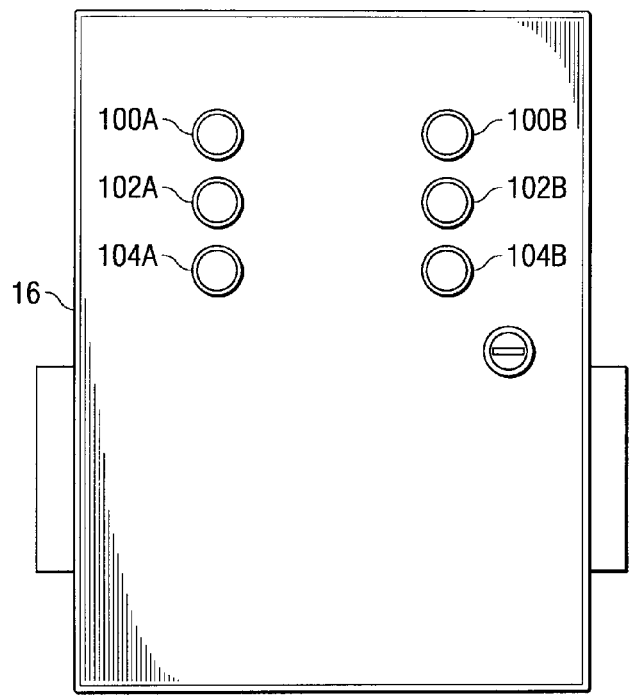
FIG. 8 shows a temperature sensing system with indicator lights, in accordance to embodiments of the disclosure.
Figure 9:
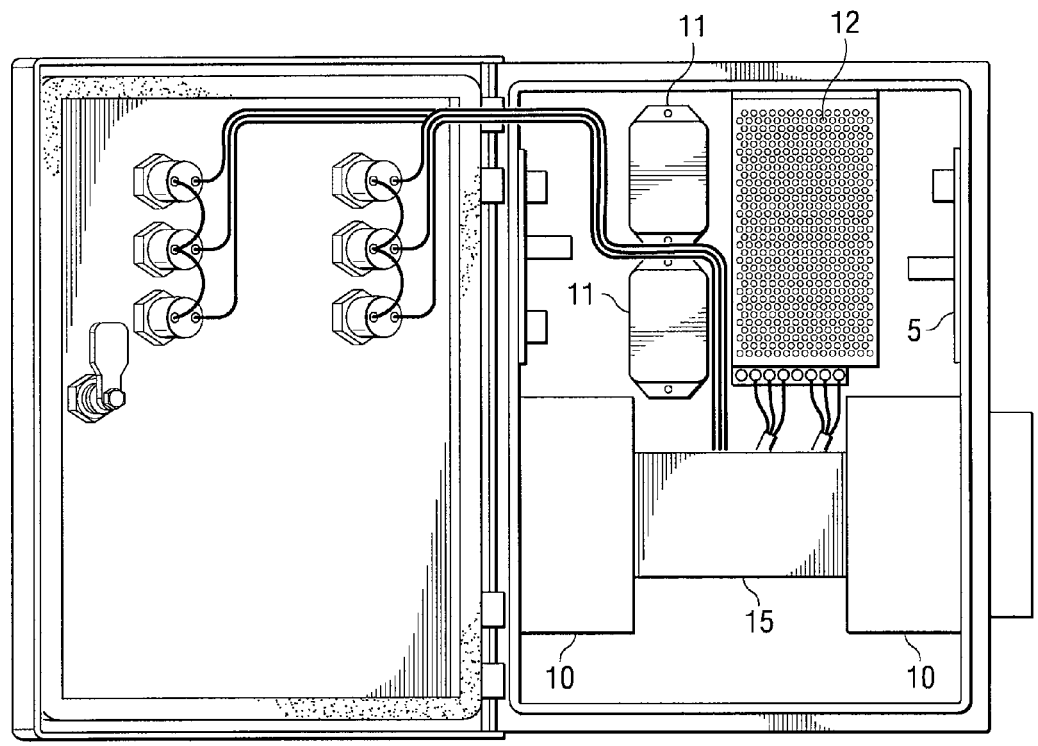
FIG. 9 shows circuitry of a temperature sensing system, in accordance to embodiments of the disclosure.

In certain embodiments, the dual reference cells may be used in tandem, with one reference cell cooling below ambient temperature and one reference cell heating above ambient temperature, using for example the TE controller and TE module. In particular, the cooling and heating may be set to a known temperature. Light indicators on enclosure 16 may be illuminated to show the "status" of the temperature adjustments. In one respect, indicator lights 100A, 102A, and 104A may be used to indicate the status of a first reference cell and indicator lights 100B, 102B, and 104B may be used to indicate the status of the second reference cell. If the first reference cell needs to be adjusted to a temperature above the ambient temperature, the red indicator light (100A) may illuminated during the adjusting period. Similarly, if the second reference cell needs to be adjusted to a temperature below the ambient temperature, a blue indicator light (104B) may be illuminated during the adjusting period. When each of the reference cells has reached the predetermined temperature(s), a green indicator light, respectively 102A and 102B may be illuminated, as shown in FIG. 8. The internal circuitry coupled to the indicator lights are shown in FIG. 9.

In one respect, the pucks may be interchangeable so the heating and cooling can be reversed if required. In certain embodiments, if one puck fails, calibration may still be made with one puck becoming variable and executing a known temperature sequence. The technique may be a time dependent process which sets the single reference cell to a known temperature above ambient for a period, then changes the temperature to a set below ambient and so on. The DTS instrument may automatically identify this situation.

Figure 7:
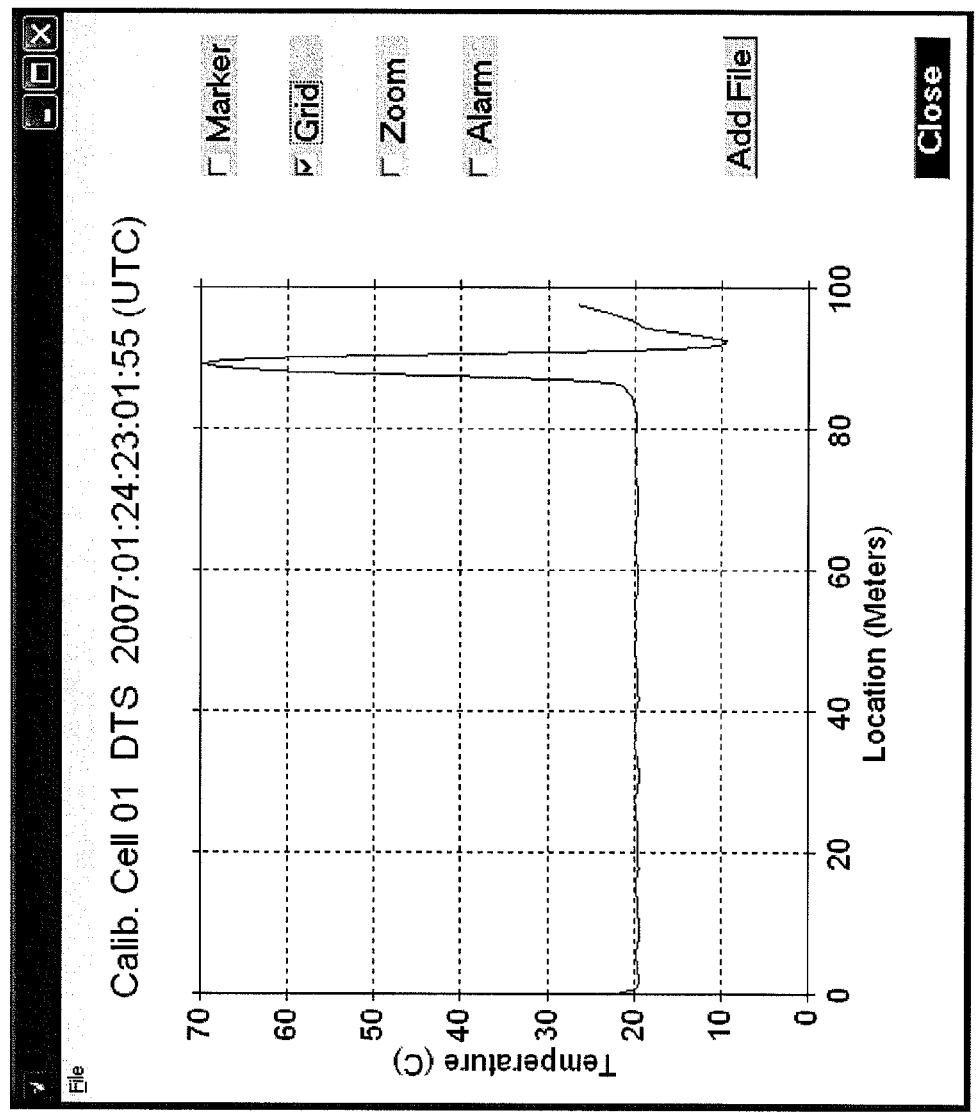
FIG. 7 is a distributed temperature sensing graph, in accordance to embodiments of the disclosure.

In one example, the temperatures show up on the DTS (distributed temperature sensing) graph as a positive (above ambient temperature) and negative spike (below ambient temperature) as shown in FIG. 7. Since the temperatures are known, the software of the distributed temperature sensing system may automatically adjust the range and offset and calibrate the entire system.

Illustrative embodiments comprise numerous features and advantages as compared to existing systems. For example, the incorporation of two pucks in certain embodiments enables a high and low reference temperature. Multiple pucks also enables an onsite fiber optic cable to be wound without twisting and makes the system redundant in case of failure. In addition, certain embodiments may be mounted anywhere on the length of the fiber cable without cutting the cable. Furthermore, in certain embodiments, the pucks may be wound outside of the unit and then inserted on the TE modules without cutting the cable. In certain embodiments, the unit is a "stand alone" unit and does not require communication with the DTS unit.

Techniques of this disclosure may be accomplished using any of a number of programming languages. Suitable languages include, but are not limited to, BASIC, FORTRAN, PASCAL, C, C++, C#, JAVA, HTML, XML, PERL, etc. An application configured to carry out the invention may be a stand-alone application, network based, or wired or wireless Internet based to allow easy, remote access. The application may be run on a personal computer, a data input system, a PDA, cell phone or any computing mechanism.

With the benefit of the present disclosure, those having ordinary skill in the art will comprehend that techniques claimed here may be modified and applied to a number of additional, different applications, achieving the same or a similar result. The claims cover all such modifications that fall within the scope and spirit of this disclosure.

The invention claimed is:

1. A remote temperature calibration apparatus for use in calibration of a distributed fiber optic temperature measurement system comprising:
   a. a first reference cell coupled to a first temperature control system configured to attain a first reference cell temperature;
   b. a second reference cell coupled to a second temperature control system and to said first reference cell and configured to attain a second reference cell temperature, the first and second reference cell temperatures being different;
   c. wherein said first and second reference cells are configured to be inserted into and removed from an enclosure housing the first and second reference cells;
   d. wherein said first and second reference cells are configured to allow a fiber optic sensing cable, without being cut, to be wrapped around the first and second reference cells while said first and second reference cells are removed from the enclosure; and
   e. wherein said enclosure housing said first and second reference cells is located remote from said distributed fiber optic temperature measurement system.

2. The remote temperature calibration apparatus of claim 1 wherein each of said first and second reference cells comprise a thermal module integrated with a puck over which the fiber optic sensing cable may be wrapped, and a thermal module temperature controller.

3. The remote temperature calibration apparatus of claim 2, wherein said thermal module temperature controller is self-contained to allow operation independent of said distributed fiber optic temperature measurement system.

4. The remote temperature calibration apparatus of claim 1 wherein said first reference cell temperature is controlled at above ambient temperature.

5. The remote temperature calibration apparatus of claim 1 wherein said second reference cell temperature is controlled at below ambient temperature.

6. The remote temperature calibration apparatus of claim 1, where if the first reference cell fails, a calibration can still be made with the second reference cell becoming variable and executing a known temperature sequence.

7. The remote temperature calibration apparatus of claim 1, wherein said enclosure housing contains an independent power source selected from the group consisting of a DC power source, an AC power source, and a solar panel.

8. A method for calibrating a distributed fiber optic temperature measurement system comprising the steps of:
   a. placing a fiber optic sensing cable in contact with thermal modules in a first reference cell and a second reference cell; said reference cells located in a remote temperature calibration apparatus;
   b. adjusting a reference cell temperature of said first reference cell to above an ambient temperature;
   c. adjusting a reference cell temperature of said second reference cell to below an ambient temperature;
   d. automatically calibrating the distributed fiber optic temperature measurement system by calculating the temperature at the first and second reference cells using the ratio of backscattered Stoke and Anti-Stokes Raman intensities from those reference cells.

9. The method for calibrating a distributed fiber optic temperature measurement system of claim 8 wherein said placing the fiber optic sensing cable in contact with thermal modules in a first reference cell and a second reference cell comprises winding said fiber optic sensing cable onto said first reference cell and a second reference cell without cutting.

10. The method for calibrating a distributed fiber optic temperature measurement system of claim 8 wherein if the first reference cell fails, a calibration can still be made with the second reference cell becoming variable and executing a known temperature sequence.

* * * * *